Dec. 15, 1970 P. C. DHIR ET AL 3,548,195

RADIATION SENSITIVE DOCUMENT SCANNING MEANS

Filed Nov. 24, 1967 2 Sheets-Sheet 1

INVENTORS
PARTAP C. DHIR
FRANKLIN L. HEADD
BY Ronald Zibelli

ATTORNEYS

INVENTORS
PARTAP C. DHIR
FRANKLIN L. HEADD
BY Ronald Zibelli
ATTORNEYS

United States Patent Office 3,548,195
Patented Dec. 15, 1970

3,548,195
DOCUMENT SCANNING RADIATION SENSITIVE MEANS

Partap C. Dhir, Penfield, and Franklin L. Headd, Webster, N.Y., assignors to Xerox Corporation, Rochester, N.Y., a corporation of New York
Filed Nov. 24, 1967, Ser. No. 685,590
Int. Cl. G01k 9/00
U.S. Cl. 250—219 12 Claims

ABSTRACT OF THE DISCLOSURE

Apparatus for scanning a document in which a document is supported on a rotatable support member and flood illuminated at a scanning station as it is advanced in relation thereto. The illuminated image of the document is directed at the scanning apparatus by a lens system and cut into a line of light by an aperture in an opaque plate. Increments of the line of light thus generated are metered to within an opaque rotating cylinder by a transparent helical aperture in the rotating cylinder. Light entering the rotating cylinder is collected by a collimating lens segment optically aligned with the line cutting aperture and projected onto a reflecting surface also mounted within the rotating cylinder. Light is reflected axially along the rotating cylinder by the reflecting surface to a collecting lens from which it is projected onto the surface of a single photosensitive device. The light collection optics produce a spot of light at the photosensitive device of uniform intensity across the length of scan which is utilized to produce a uniform output therefrom.

BACKGROUND OF THE INVENTION

This invention relates generally to recording and scanning apparatus and more particularly to improved facsimile recording and scanning apparatus of the mechanical type employing the combination of helical and linear elements. This technique utilizes the scanning effect resulting from the intersection of a straight slit aperture and a rotating drum containing a helical aperture. As the drum rotates, incremental bits of information are gated to within the drum.

Mechanical scanning techniques as relating to facsimile equipment are generally known, as are the use of the combination of helical and linear elements. However, heretofore, these helical drum scanning techniques have found only limited utilization due largely to the inability to direct the light from within the drum onto a light sensitive device efficiently and uniformly. Because of these physical limitations of helical scanners and shortcomings in other types of mechanical scanning apparatus, it has therefore been necessary in many instances to utilize cathode ray tubes as scanning devices in many facsimile systems. These cathode ray tube systems have proven extremely effective because of the versatility thereof as well as the adaptability to techniques utilized in bandwidth compression. The most serious drawback to the cathode ray tube system, however, has been the inherent complexity which results in a higher cost of the facsimile equipment.

In some known mechanical scanning apparatus, a light spot is directed upon the copy and the light which is reflected therefrom utilized to actuate a photoelectric cell. In such a system, since the only illumination on the document is the scanning spot itself, any light leaks in the exposure area produce a significant effect on the video signal level. It has been found that by operating the system in reverse this adverse effect can be greatly minimized. That is, by flooding the document with light and mechanically gating a spot thereof at the scanning device, any small amount of ambient light falling on the document produces insignificant effects on the video signal.

Other scanning techniques have involved utilizing light transmitted through the copy sheet. In these devices a lamp may be placed on one side of the copy sheet, and scanning accomplished at the intersection between a helical aperture in a rotating drum and a linear stationary aperture, both on the opposite side of the copy sheet from the lamp. Light entering the scanning aperture is then detected by photoelectric cells mounted at the ends of the drum and an electrical signal is generated thereby according to the scanned information.

While helical slit scanners in many respects comprise desirable scanning devices and have proven satisfactory for some types of facsimile equipment, they have heretofore not found extended usage in most facsimile systems largely due to the inefficiency of the light collecting apparatus, and the nonuniformity with which light is directed to the light sensing means.

Previous attempts to improve such devices have included utilization of a parabolic deflecting surface within the drum to direct the light to a photomultiplier tube at the parabolic focus. While such arrangements generally exhibit improved efficiency, the uniformity nevertheless remains extremely poor.

Another approach has been the use of a straight light conductive rod of a material such as Lucite placed along the axis of the drum for transmitting light to a photomultiplier tube. While this technique improves the uniformity characteristics, the efficiency of such system is very poor.

Still another approach has been the improvement of light collecting apparatus as disclosed in co-pending application, Ser. No. 685,591, filed Nov. 24, 1967, in the names of Partap C. Dhir and Elliot H. Woodhull filed concurrently herewith and assigned to the same assignee. The instant application is a further improvement of light collecting apparatus over that disclosed in co-pending application Ser. No. 685,591.

SUMMARY OF THE INVENTION

Accordingly, it is an object of the present invention to improve the efficiency and uniformity of helical scanning apparatus.

It is another object of the invention to provide improved light collecting apparatus for use in a helical scanning system.

It is still another object of the invention to provide improved helical scanning apparatus which is effective for high speed scanning, yet which is compact and inexpensive.

It is yet a further object of the invention to provide improved scanning apparatus which provides a substantially uniform output across the length of scan with good uniformity and efficiency.

These and other objects of the invention are attained by means whereby a document to be scanned is flood illuminated as it is advanced in relation to the scanning apparatus. The illuminated image of information is directed at the scanning apparatus by a lens system and cut into a line of light by a transparent aperture in an opaque plate. Increments of the line of light thus generated are metered to within an opaque rotating cylinder having a transparent helical aperture therein. Light thus entering the rotating cylinder is directed by a first lens onto a reflector which reflects the subject light to a second lens at one end of the rotating cylinder. The second lens arrangement focuses the subject light onto a photosensitive device which generates a signal in response to the light received thereby.

DESCRIPTION OF THE PREFERRED EMBODIMENTS

Figure 1:
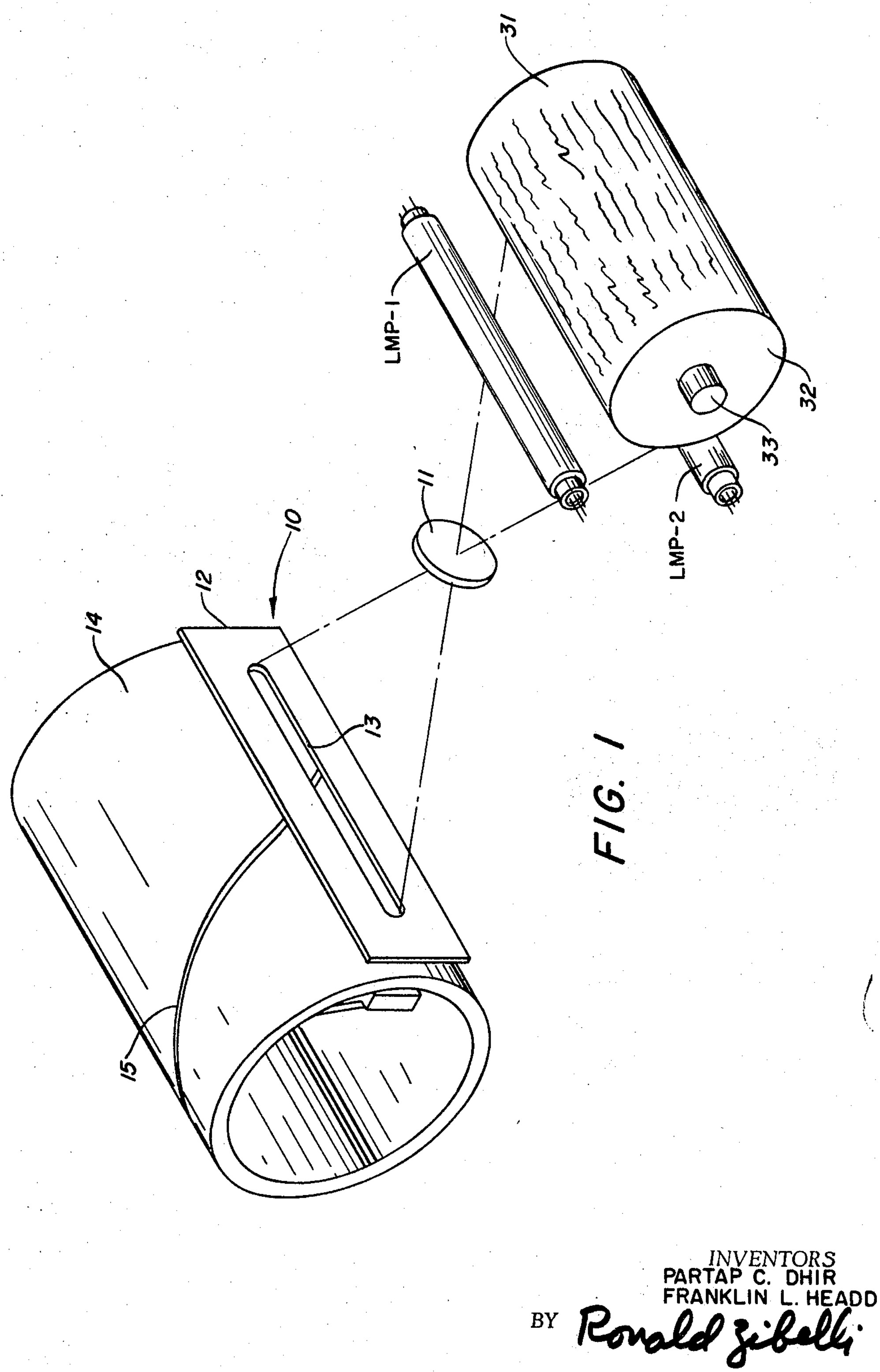
FIG. 1 is a schematic perspective view of one embodiment of the improved scanning system.

With reference to FIG. 1, a document 31 which is to be scanned in a manner according to the present invention, may be supported on a rotatable drum member 32 which rotates about an axis 33. A pair of lamps LMP–1 and LMP–2 are positioned to flood illuminate the document as the document is advanced. The illuminated portion of the document is projected to the scanning apparatus generally designated 10 by a suitable lens arrangement 11 in a pattern of light and dark areas corresponding to the information on document 31

At the scanning apparatus, the projected pattern of information is cut into a narrow line of light by an aperture 13 in aperture plate 12. Aperture 13 along the narrow dimension thereof may have an order of magnitude on the order of two mills depending on the resolution desired. Aperture plate 12 preferably comprises a piece of transparent material, for example, Lucite. Aperture 13 in the preferred embodiment is preferably formed by masking aperture plate 12 with an opaque material such as exposed photographic film for example. A photographic film is exposed in a configuration corresponding to the desired size of aperture and thereafter developed by conventional processing methods. Thus, in the exposed area, the film substrate is transparent, all of the film emulsion having been removed by the photographic developing process. However, in the unexposed areas surrounding the aperture the emulsion remains, leaving a dark opaque coating thereon. The film substrate is then bonded to aperture plate 12 by a suitable bonding agent. Inasmuch as aperture 13 is of extreme criticality in the scanning process, the formation of such an aperture by photographic process affords much greater accuracy over more conventional manufacuring methods such as by machining an aperture in a metallic plate or the like and reduces the possibility of interference produced by dust, lint, and other particles which may be accumulated in a slit.

Figure 2:
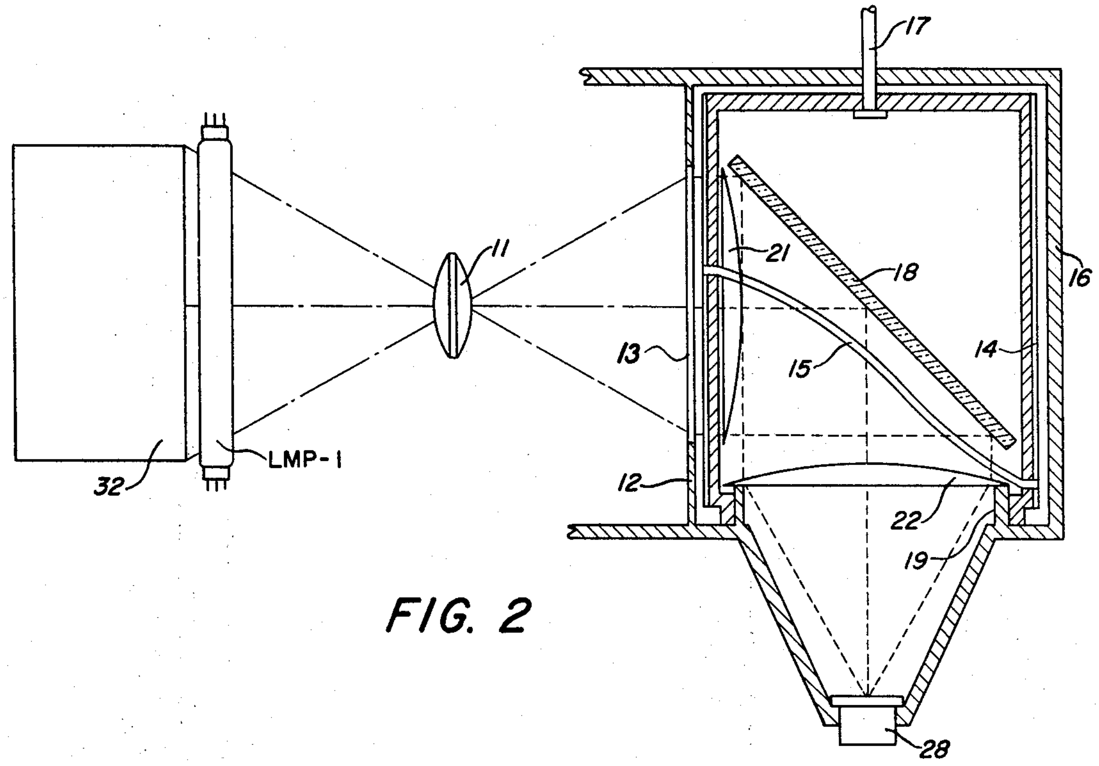
FIG. 2 is a plan sectional view of one embodiment of scanner according to the present invention.

As schematically illustrated in FIG. 1, a scanning drum 14 is positioned behind aperture plate 12 in the path of light cut by aperture 13. As illustrated in FIG. 2, cylindrical drum 14 is rotatably mounted in support housing 16 via shaft 17 and bearing support 19 and is adapted to be rotated by a suitable power source operatively connected to shaft 17. A helical aperture 15 is formed in the circumferential periphery of scanning cylinder 14 for cutting the line of light projected through aperture 13 into a small spot of light. Aperture 15 is preferably formed in a manner similar to that used in forming aperture 13 in aperture plate 12. Thus, drum 14 preferably comprises a transparent plastic material such as Lucite, for example, which is covered with an opaque material such as exposed photographic film to form helical aperture 15. By utilizing known photographic processes, a helix can be formed which is much more accurate and efficient than those formed by mechanical machining methods.

A collimating lens segment 21 is positioned within scanning cylinder 14 adjacent the interior periphery thereof in optical alignment with aperture 13. A reflecting member 18 within scanning cylinder 14 is interposed in the optical path of light emanating from aperture 13 and collimating lens segment 21 at an angular displacement such as to intersect the collimated light and reflect the beam axially along scanning cylinder 14.

A collector lens 22 is supported on bearing support 19 in support frame 16 and collects the collimated light reflected by reflecting member 18. A single photosensitive device such as photomultiplier tube 28 is axially positioned with respect to scanning cylinder 14 in support frame 16. Light from collector lens 22 is projected onto the photosensitive surface of photomultiplier tube 28. Photomultiplier tube 28 thus produces an electrical output therefrom in response to the impinging light patterns.

From this arrangement it may be seen that a light spot entering scanning cylinder 14 at a point coextensive with either of the lateral extremities of aperture 13 will impinge upon photomultiplier tube 28 with the same intensity as a spot of light entering scanning cylinder 14 at any point across the length of scan. Because of the uniform intensity of light which impinges upon photomultiplier tube 28, a uniform output voltage is generated thereby across the length of scan.

Figure 3:
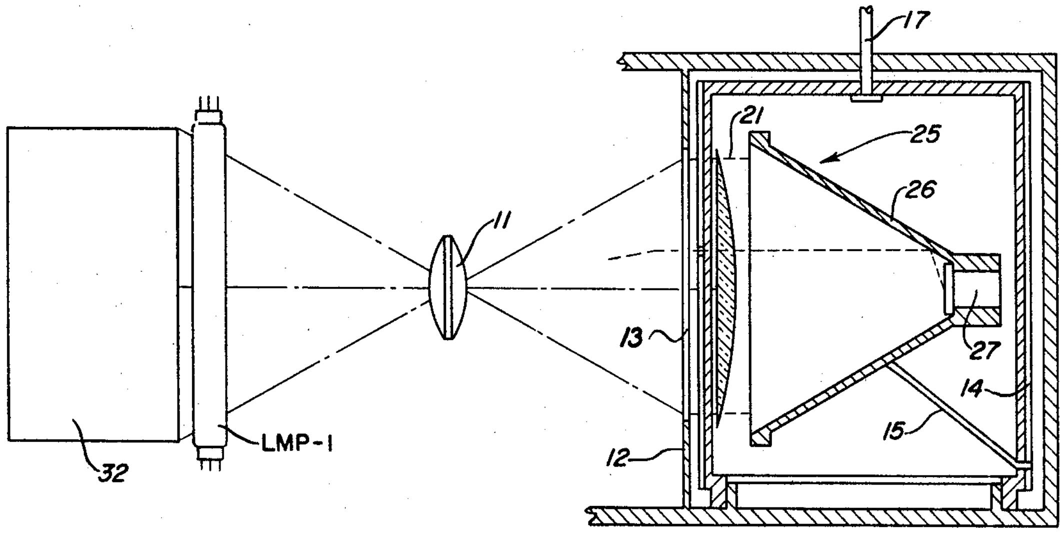
FIG. 3 is a plan sectional view of a second embodiment of scanner according to the present invention.

In the embodiment as illustrated in FIG. 3 an axicon may be utilized to collect and condense the collimated light emanating from lens segment 21. As illustrated therein axicon 25 includes a conical member 26 having a large diameter at one end thereof which is optically aligned to receive light emanating from lens segment 21. The inside surface of conical member 26 may be coated with either a specular reflective material which reflects the collimated light received from lens segment 21 to a central point along the axis of conical member 26 or a diffusely reflective material. A diffusely reflecting material such as magnesium carbonate is one type material which works particularly well as a coating within conical member 26. A photodiode 27 is positioned at the apex of conical member 26 to receive the reflected light patterns. Photodiode 27 in response to the impinging light patterns produces an output voltage therefrom which is uniform across the length of scan due to the uniformity of intensity with which light impinges thereon.

In the embodiment as illustrated in FIG. 2, an axicon and photodiode such as that illustrated in connection with the embodiment of FIG. 3 may be substituted for the condensing lens 22 and photomultiplier tube 28. This arrangement likewise yields a very effective mechanical scanning device which produces a uniform output across the length of scan.

Thus it may be seen that by providing an improved light collection system which concentrates impinging light patterns at a single photosensitive device with uniform intensity, the efficiency of mechanical scanning devices can be substantially improved thus obtaining a uniform output across the length of scan.

While the invention has been described with reference to its preferred embodiments, it will be understood by those skilled in the art that various changes may be made and equivalents may be substituted for elements thereof without departing from the true spirit and scope of the invention.

What is claimed is:

1. A facsimile scanning apparatus comprising in combination, a support member adapted to support a document to be scanned, illumination means for flood illuminating a document to be scanned, drive means for advancing a document past said illumination means, a rotatable cylindrical member having a helical aperture therein, drive means for advancing said cylindrical member about the axis thereof, means for projecting an image of an illuminated document onto said cylindrical member, a stationary plate member interposed between said support member and said cylindrical member having a longitudinal aperture therein extending axially along said cylindrical member and optically aligned with a projected image of an illuminated document, light collimating means positioned within said cylindrical member for receiving light entering said cylindrical member through the intersection of said helical and longitudinal apertures and for projecting a collimated light beam radically within said cylindrical member, photosensitive means for generating an electrical signal in response to impinging light beams, and light condensing means for projecting said collimated light beam onto said photosensitive means.

2. Apparatus according to claim 1, said light condensing means comprising a generally conical member having a reflective coating on the inside surface thereof adapted to reflect a collimated light beam onto said photosensitive means.

3. Apparatus according to claim 2, said photosensitive means comprising a photodiode positioned along the axis of revolution of said conical member.

4. A facsimile scanning apparatus comprising in combination, a support member adapted to support a document to be scanned, illumination means for flood illuminating a document to be scanned, drive means for advancing a document past said illumination means, a rotatable cylindrical member having a helical aperture therein, drive means for advancing said cylindrical member about the axis thereof, means for projecting an image of an illuminated document onto said cylindrical member, a stationary plate member interposed between said support member and said cylindrical member having a longitudinal aperture therein extending axially along said cylindrical member and optically aligned with a projected image of an illuminated document, light collimating means positioned within said cylindrical member for receiving light entering said cylindrical member through the intersection of said helical and longitudinal apertures and for projecting a collimated light beam radially within said cylindrical member, reflecting means angularly disposed within said cylindrical member to intercept and reflect a collimated light beam axially within said cylindrical member, photosensitive means positioned at one end of said cylindrical member for generating an electrical signal in response to impinging light beams, and light condensing means for projecting said collimated light beam reflected by said reflecting means onto said photosensitive means.

5. Apparatus according to claim 4, said light condensing means comprising a generally conical member having a reflective coating on the inside surface thereof adapted to reflectively project said collimated light beam onto said photosensitive means.

6. Apparatus according to claim 4, said light condensing means comprising a collector lens adapted to project said collimated light beam onto said photosensitive means.

7. Light collection apparatus for use in a facsimile scanning device of the type wherein a cylindrical member having a helical aperture therein is rotated past a longitudinal aperture in a stationary plate member to scan a document including, light collimating means positioned within said cylindrical member for receiving light entering said cylindrical member through the intersection of said helical and longitudinal apertures and for radially projecting a collimated light beam within said cylindrical member, photosensitive means for generating an electrical signal in response to impinging light beams, and light condensing means for projecting said collimated light beam onto said photosensitive means.

8. Apparatus according to claim 7, said light condensing means comprising a generally conical member having a reflective coating on the inside surface thereof adapted to reflect said collimated light beam onto said photosensitive means.

9. Apparatus according to claim 8, said photosensitive means comprising a photodiode positioned along the axis of revolution of said conical member.

10. Light collection apparatus for use in a facsimile scanning device of the type wherein a cylindrical member having a helical aperture therein is rotated past a longitudinal aperture in a stationary plate member to scan a document including, light collimating means positioned within said cylindrical member for receiving light entering said cylindrical member through the intersection of said helical and longitudinal apertures and for radially projecting a collimated light beam within said cylindrical member, photosensitive means positioned at one end of said cylindrical member for generating an electrical signal in response to impinging light beams, and light condensing means for projecting said collimated light beam onto said photosensitive means.

11. Apparatus according to claim 10, said light condensing means comprising a generally conical member having a reflective coating on the inside surface thereof adapted to reflectively project said collimated light beam onto said photosensitive means.

12. Apparatus according to claim 10, said light condensing means comprising a collector lens adapted to project said collimated light beam onto said photosensitive means.

References Cited

UNITED STATES PATENTS

| | | | |
|---|---|---|---|
| 1,176,147 | 3/1916 | Keen | 250—219X |
| 1,897,219 | 2/1933 | Schroter | 250—228X |
| 2,371,963 | 3/1945 | La Pierre | 250—219 |
| 2,398,238 | 4/1946 | McNatt | 250—219X |
| 2,871,369 | 1/1959 | Williams | 250—236X |
| 3,055,582 | 9/1962 | Battison et al. | 250—219X |
| 3,170,032 | 2/1965 | Evans et al. | 178—7.6X |

WALTER STOLWEIN, Primary Examiner

U.S. Cl. X.R.

178—76; 356—71